Aug. 12, 1924.

S. E. ARMSTRONG ET AL 1,504,309

THRUST BEARING

Filed Oct. 21, 1922

INVENTORS
STANLEY E. ARMSTRONG
EDWIN JOHN GOYETTE
BY
Harry C. Schwede
ATTORNEY

Patented Aug. 12, 1924.

1,504,309

UNITED STATES PATENT OFFICE.

STANLEY E. ARMSTRONG AND EDWIN JOHN GOYETTE, OF OAKLAND, CALIFORNIA.

THRUST BEARING.

Application filed October 21, 1922. Serial No. 595,971.

*To all whom it may concern:*

Be it known that we, STANLEY E. ARMSTRONG and EDWIN JOHN GOYETTE, citizens of the United States, residing at Oakland, in the county of Alameda and State of California, have invented certain new and useful Improvements in Thrust Bearings, of which the following is a specification.

Our invention is an improved thrust bearing.

The object of our invention is to provide a bearing which will not wear rapidly at high angular speeds.

At high speeds the balls in the bearings will slip which greatly increases the friction and consequent wear. Standard practice in the installation of roller bearings is to cause the inner race to rotate with the shaft and the outer race is stationary. The balls will rotate at the same speed as the shaft with this construction. In our construction we cause the balls through friction to rotate the outer race of the bearing, thus materially decreasing the relative speed of the outer race and the balls.

In the drawing in which our invention is illustrated, we have shown one form of our invention but it may be embodied in other forms, and in the specification and appended claims we desire to cover the invention in whatever form it may be embodied.

Referring to the drawing.

Figure 1:
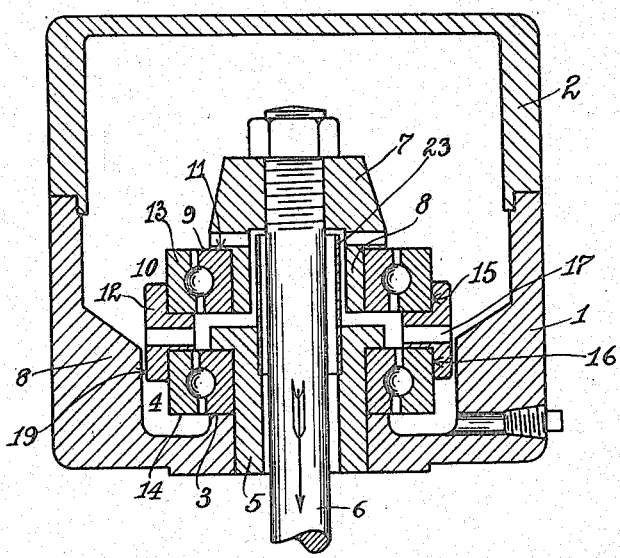
Figure 1 is a transverse sectional view of a one-way thrust bearing embodying our invention.

Referring more particularly to the drawing our bearing is enclosed in a casing 1 upon which is set a cap 2. The inner race 3 of a ball bearing 4 is held stationary against the bottom of the casing 1 by a gland 5 which is pressed into said casing and against the top of the inner race.

The shaft 6 has secured to its upper end a head 7 which head is formed with a depending apron 8. The apron 8 fits tightly into the inner race 9 of a ball bearing 10, which race rests against a shoulder 11 of the head 7. A ring 12 is secured to the outer race 13 of the bearing 10 and the outer race 14 of the bearing 4. The race 13 fits tightly into a groove 15 in the top of the ring 12 and the race 14 fits into a groove 16 in the bottom of the ring 12. Oil ports 17 are provided in the ring 12 between the bearings 4 and 10.

The inner surface of the casing 1 is built inwardly as at 18 to form a small annular space 19 between the ring 12 and the wall. At high angular speeds the oil is thrown from the ports 17 and enters the space 19 very slowly. Sufficient oil enters to thoroughly lubricate the bearings, but not enough to cause it to splash.

Figure 2:
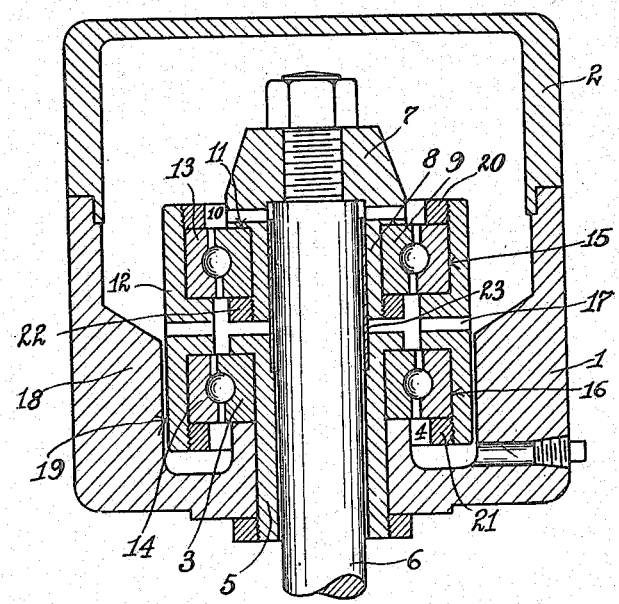
Figure 2 is a transverse sectional view of a two-way thrust bearing embodying our invention.

In the two-way thrust bearing shown in Figure 2, a collar 20 is screwed to the ring 12 against the race 13 and a second collar 21 is screwed to the bottom of the ring 12 against the race 14. A nut 22 is screwed to the bottom of the apron 8 against the race 9.

The thrust of the shaft 6 is transmitted to the race 9 through the head 7. The frictional engagement of the balls in the bearings against the outer race 13 causes it to rotate at a less speed than the inner race 9. Since the ring 12 is secured to the race 13 it also rotates and carriers with it the lower race 14. The thrust is also transmitted through the ring 12 and race 14 to the balls of the lower bearing 4 and to the stationary race 3. A sleeve 23 is secured to the gland 5 and rises from the top thereof to prevent the oil from flowing around the shaft 6 out of the casing 1.

Figure 3:
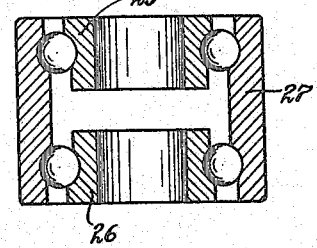
Figure 3 is a transverse sectional view of a modified form of roller bearing.

In Figure 3 we have shown a modified form of bearing in which there are two inner races 25 and 26 and the outer race is formed in a single sleeve 27. This construction abolishes the ring 12.

Having described our invention, we claim:

1. A thrust bearing comprising a casing, two superimposed ball bearings in said casing, said bearings consisting of an inner and an outer race, a ring joining the outer races, means for securing the inner race of the lower bearing to said casing, and means for securing the load shaft to said inner race of the upper bearing.

2. A thrust bearing comprising a casing, a plurality of superimposed bearings in said casing, said bearing consisting of an inner and an outer race, means to secure the inner race of the lower bearing to the casing, means to secure the inner race of the upper bearing to the shaft, and means to join the outer races of said bearings.

3. A thrust bearing comprising a casing, a plurality of superimposed annular ball bearings in said casing, said bearings consisting of an inner and an outer race, the outer races being secured together, means to secure the inner race of the lower bearing to the casing, and means to secure the inner race of the upper bearing to the shaft.

In testimony whereof we affix our signatures.

STANLEY E. ARMSTRONG.
EDWIN JOHN GOYETTE.